Feb. 11, 1958   W. P. SCHIRMER ET AL   2,822,760
ROTARY PUMP
Filed Oct. 5, 1953   2 Sheets-Sheet 1

INVENTORS
WALDO P. SCHIRMER
& RICHARD A. KNAUS.
BY
RICHEY, WATTS, EDGERTON & McNENNY
A. H. Edgerton
ATTORNEYS Feb. 11, 1958 W. P. SCHIRMER ET AL 2,822,760
ROTARY PUMP
Filed Oct. 5, 1953 2 Sheets-Sheet 2

INVENTORS
WALDO P. SCHIRMER
& RICHARD A. KNAUS.
BY
RICHEY, WATTS, EDGERTON & McNENNY
A. H. Edgerton.
ATTORNEYS

United States Patent Office 2,822,760
Patented Feb. 11, 1958

2,822,760
ROTARY PUMP

Waldo P. Schirmer, Cleveland, and Richard A. Knaus, Shaker Heights, Ohio, assignors, by mesne assignments, to The Wayne Pump Company, Salisbury, Md., a corporation of Maryland Application October 5, 1953, Serial No. 383,996

2 Claims. (Cl. 103—126)

This invention relates to rotary pumps adapted for handling all manner of fluids, and more particularly to gear pumps having a driven rotor and an idler rotor.

The preferred embodiment of my invention is a rotary gear pump having a casing, an outer driving gear, and an inner driven idler gear eccentrically mounted with respect to the outer gear in intermeshing relation thereto in such a manner that upon rotary movement of the gears, fluid is drawn into the casing and through the teeth of the outer gear, the fluid having its pressure increased by the sealing action of the intermeshing teeth, and is finally discharged at an increased pressure from the casing. The sealing action of the teeth is obtained by maintaining each tooth on the idler gear in contact with at least one of the teeth on the outer gear continuously. The pumping action is further enhanced by having the teeth of the outer gear spaced in order that fluid may pass radially therebetween, thus reducing the friction and the distance which the fluid must travel internally of the pump. The teeth of the outer gear and the inner rotor are so shaped for complemental engagement that a minimum of space remains when the teeth are fully engaged. This is accomplished by providing a tooth shape on the idler rotor which will allow the tooth to extend to the periphery of the outer gear.

The most important object of this invention, therefore, is to provide a rotary pump having a minimum of parts in frictional engagement and having pumping elements which are durable and rugged and may be manufactured inexpensively without elaborate machining operations.

Another object of this invention is to provide a rotary pump construction of compact design and a higher capacity than other pumps of similar physical dimensions.

A further object of this invention is to provide a rotary pump in which the flow is radial as it enters and leaves the pumping elements thus reducing the length of the flow path to a minimum with a like reduction of friction which results in an increase in capacity and efficiency.

A further object of this invention is to provide a rotary pump of the gear type having an outer gear and an inner idler gear arranged in such a manner that the crescent commonly used with this construction is not required.

A still further object of this invention is to provide related gears with circular tooth forms which materially lowers the cost of manufacture and increases the degree of accuracy which can be maintained with consequent improvement of efficiency and wear-life.

Other objects, features and advantages of the invention will become apparent from a consideration of the following detailed specification taken in connection with the accompanying drawings, in which:

Fig. 3 is a fragmentary end view similar to Fig. 1 showing the gears in a different relative position; and Fig. 4 is a detail view of the outer pumping gear and shaft assembly.

Figure 1:
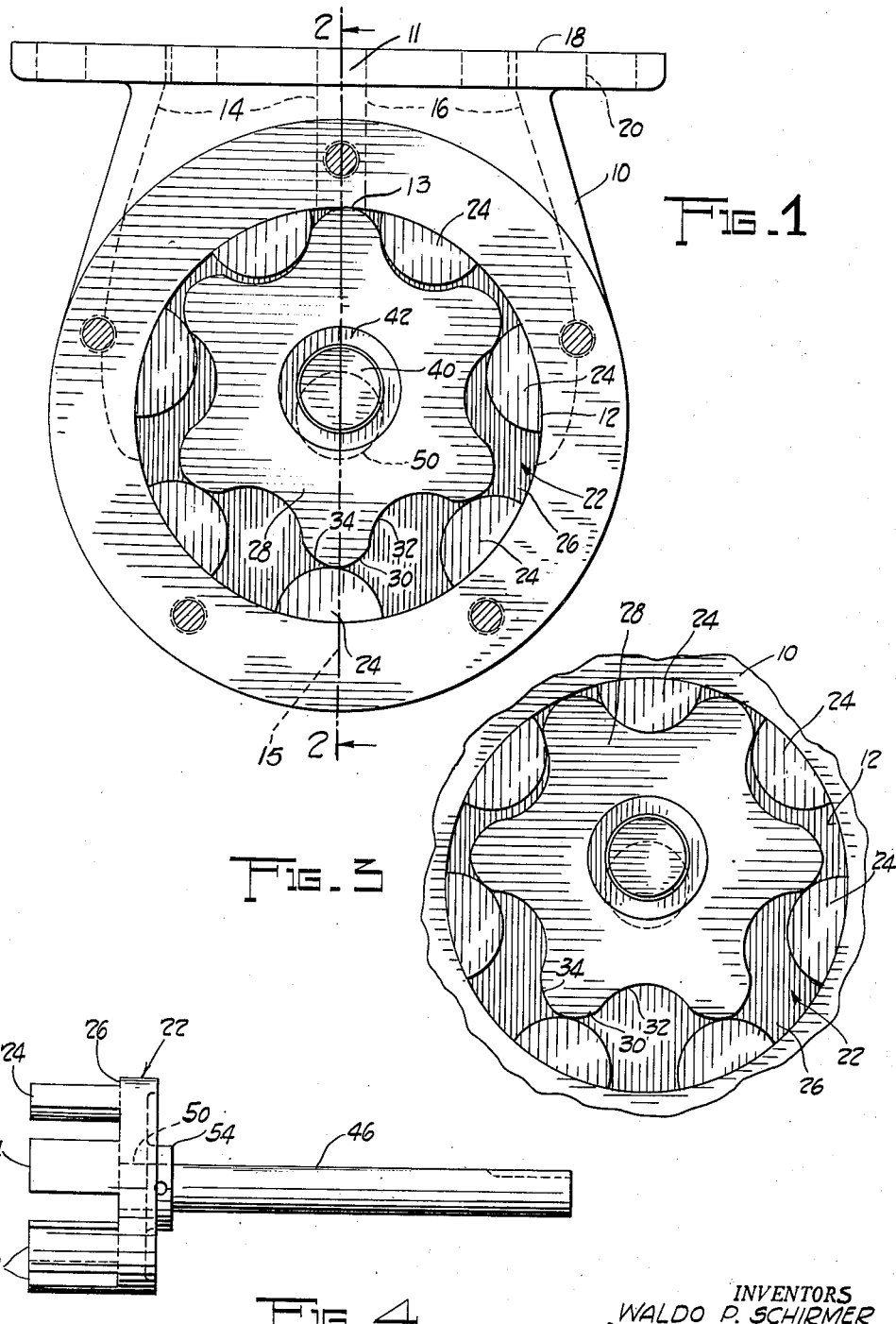
Fig. 1 is an end view of a pump embodying my invention with parts removed for purposes of clarity.
Figure 2:
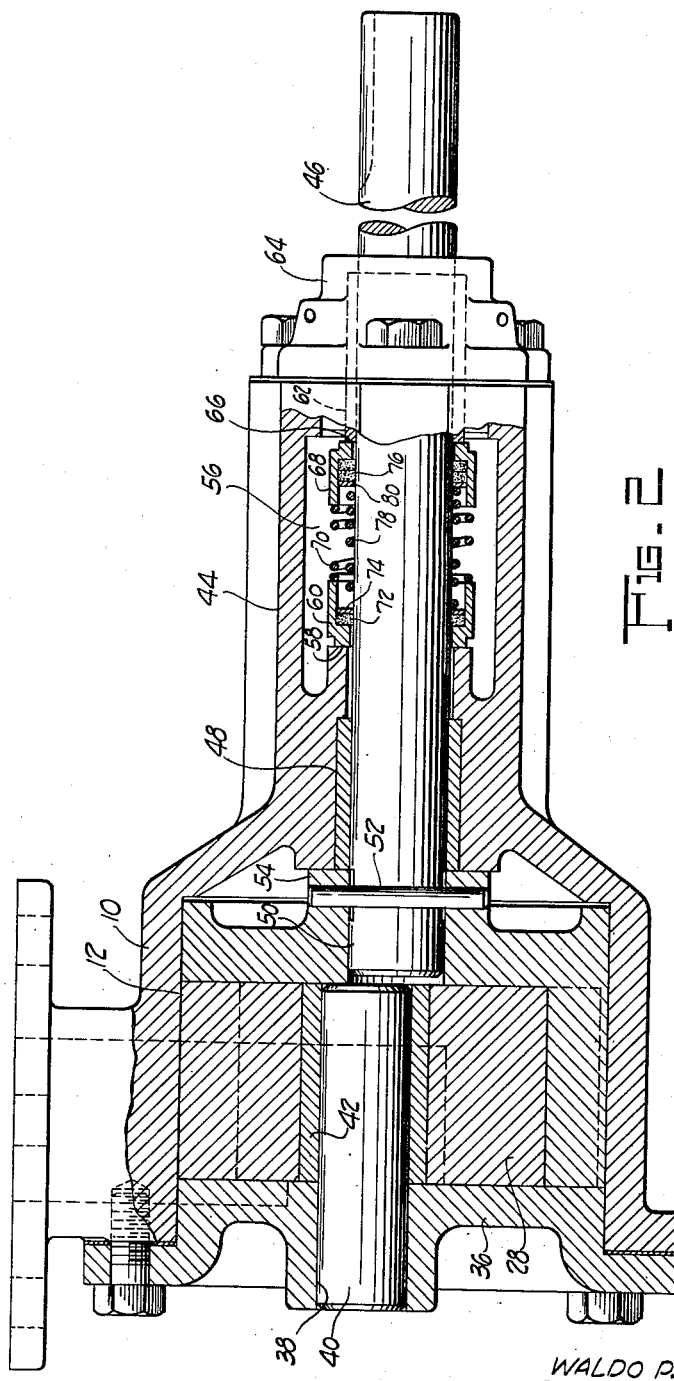
Fig. 2 is a longitudinal sectional view taken along line 2—2 of Fig. 1.

Referring first to Figs. 1 and 2, a pump embodying my invention is shown therein having a hollow casing 10. A cylindrical cavity 12 is formed in the casing 10 having its centerline conforming to the general axis of the casing 10. An inlet port 14 and an outlet port 16 are located in the casing 10 and each have one end opening into the cavity 12 and the other end opening externally of the pump casing for connection to the usual piping system. A flange 18 having a plurality of bolt holes 20 is provided on the casing 10 for affixing a companion flange and piping thereto.

A pumping gear or outer rotor 22 is mounted for rotation within cavity 12 with the periphery of the gear 22 in sliding contact with the wall of the cavity 12. A plurality of teeth 24 are formed on a gear disc 26 and extend axially or longitudinally relative to the disc 26. The outer rotor teeth 24 are spaced apart providing interstices for the passage of fluid therebetween. The gear or outer rotor 22 has the appearance of a disc-like wheel with finger-like teeth extending laterally therefrom, the teeth being joined to the wheel at the outer limits of the disc 26. The teeth 24 have inner circular surfaces shaped as arcs of circles of constant radius on the portion of the teeth 24 not adjacent the wall of the cavity 12, the surfaces facing the center of rotation of the gear 22. The outer surfaces of the outer rotor which are disposed adjacent the cylindrical surface of the casing which forms a wall of cavity 12 are constructed and arranged to rotate in sealing contact relative thereto.

An idler gear or inner rotor 28 having a plurality of teeth 30 is mounted for rotation in the pump cavity 12. Teeth 30 of idler gear 28 are formed by tangent convex and concave surfaces 34 and 32. Gear 28 rotates about a center which is eccentric relative to the center of rotation of the gear 22. The axis of rotation of inner rotor 28 is disposed along an imaginary line 15 extending through the axis of rotation of outer rotor 22 and the center of the dividing wall 11 between ports 14 and 16. The centers of the respective gears are displaced a distance of one-half of the height of the teeth 24. The outer wall 32 or concave surfaces of the gear 28 between the convex surfaces 34 of teeth 30 is formed with a circular surface having a radius complementary to the outer surface of the teeth 24. More particularly, concave surfaces 32 of inner rotor teeth 30 are shaped as arcs of circles having a constant radius. The inner circular surfaces of outer rotor teeth 24 are shaped as circles having a radius of curvature slightly less than the radius of curvature of circular concave surfaces 32 of inner rotor teeth 30.

The teeth 30 on the idler gear 28 have a length which allows them to extend to the wall of the cavity 12 between the teeth 24 at the aforementioned imaginary line 15 in tangency with and between a pair of outer rotor teeth 24 in sealing contact with the inner end 13 of dividing wall 11 which end is contiguous to cavity 12. This permits inner rotor teeth 30 to displace a maximum amount of fluid from spaces between outer rotor teeth 24 at dividing wall 11 and to seal inlet port 14 from outlet port 16. To insure that inner rotor teeth 30 displace a maximum amount of fluid from the spaces between outer rotor teeth 24 when inner rotor teeth 30 are disposed between ports 14 and 16, the thickness of the dividing wall 11 is, for example, made less than the distance between outer rotor teeth 24 along the cylindrical surface of the cavity 12. The idler gear 28 must necessarily have one less tooth than the outer gear 22 since an idler gear tooth moves from the space between the teeth on the outer gear to an adjoining space during one revolution of the outer gear. To maintain the seal between the teeth on the gears without the use of a crescent boss or similar structure, it is necessary that the idler tooth be in constant engagement with one of the outer gear teeth. Accordingly, the ends 34 of the teeth 30 on the idler gear 28 are shaped in such a way that as the teeth move relative to each other, they are constantly in contact with the adjacent teeth 24 on the outer gear 22. Ends 34 are accordingly shaped as arcs of circles having a constant radius. This produces a sufficient sealing contact which effectively seals against the passage of fluid between the teeth and results in the formation of expanding and contracting pockets between the teeth. This complemental shape of ends 34 of teeth 30 in conjunction with the aforementioned displacement of the centers of inner rotor 28 and outer rotor 22 cooperate to cause inner rotor 28 to have every one of its teeth 30 in sufficient contact with at least one of teeth 24 upon outer rotor 22 at all times to maintain an adequate seal between the spaces between the teeth and between inlet port 14 and outlet port 16 about the longer path around the peripheries of rotors 22 and 30. In Fig. 1, the gears are shown with one of the teeth 30 extending to the wall of the cavity 12. In Fig. 3, the gears are shown with the complemental circular surfaces on the teeth 24 and the gear 28 in contact.

The casing 10 has a head 36 mounted on one end thereof for closing one end of the cavity 12 after the pumping gears 22 and 28 are in place. A bore 38 is formed in the head 36 having its centerline displaced from the centerline of the cavity by the amount of the eccentricity existing between the gears 22 and 28. A pin 40 is mounted in the bore 38 and extends into the cavity 12 to act as idler shaft for the gear 28. A bushing 42 is affixed to the gear 28 and functions as a bearing on the surface of the pin 40 as the gear 28 rotates.

An elongated extension 44 on the casing 10, being hollow along the medial axis thereof, supports the drive shaft 46 for rotation. A bushing 48 mounted in the extension 44 provides a bearing for the shaft 46 at the inner end thereof. The shaft 46 extends into and is affixed to the gear 22, a bore 50 being formed therein to receive the shaft 46. A cross-pin 52 extends through the hub 54 of the gear 22 and through the shaft 46 to prevent relative rotation therebetween. Shaft 46, therefore, drives the pumping elements and carries the outer gear 22 for rotation about the centerline of the cavity 12.

The casing extension 44 has an annular cavity 56 formed therein surrounding the shaft 46. At the end of the cavity adjacent the bushing 48, a shoulder 58 having its face perpendicular to the axis of the shaft is provided for sliding engagement by a sealing member 60. At the opposite end of the recess 56, a bearing 62 is located for carrying the outer end of the shaft 46, the bearing 62 being rigidly affixed to a cap 64 which closes the end of the extension 44. The bearing 62 has a face 66 perpendicular to the axis of rotation of the shaft 46 and in confronting relationship with the shoulder 58 at the opposite end of the recess 56. A seal 68 slidable on the face 66 is carried for rotation by the shaft 46, the engaging surface of the seal 68 being lapped with the face 66 to provide a fluid-type joint. A compression spring 70 is disposed between the sealing members 60 and 68 and biases them into their operating positions. A deformable rubber-like ring 72 is located between the sealing member 60 and the shaft 46 and is held in place by a washer 74. Similar rings 76 are located between the seal 68 and the shaft 46 and are compressed into sealing engagement with the seal 68 and the shaft 46 by the compressive action of a spring 78 in engagement with the washers 86. The seals 76 serve to prevent leakage between the seals 68 and the shaft 46 and to frictionally drive the seal 68 so that it rotates with the shaft 46. The member 60 does not function as a seal but operates to assure the rotation of the springs and the seal 68, since the member 60 is frictionally connected to the shaft 46 by the deformable ring 72.

In operation, the pump draws liquid through the inlet port 14 and expels the liquid through the outlet port 16. This is accomplished by the change in volume of the spaces between the contact lines formed by the engagement of the teeth on the idler and the outer gear. As the gears rotate, the idler gear tooth 34 is withdrawn from the space between the outer gear teeth, which results in a cavity that fills with liquid from the inlet port 14. After the space between the teeth reaches a maximum size, the teeth on the inner gear again enter the spaces between the outer gear teeth and the liquid is forced outwardly into the outlet port 16. Since the inner gear tooth extends to the periphery of the outer gear substantially all of the fluid is removed. Thus increasing the capacity of the pump for a given size and reducing the carryover to a minimum.

It is to be understood that although the foregoing is necessearily of a detailed character, the specific terminology is not intended to be restrictive or confining and that various rearrangements of parts and modifications of design may be resorted to without departing from the scope or spirit of the invention as herein claimed.

What is claimed is:

1. A rotary pump comprising a casing including a cylindrical cavity having an inlet and an outlet port disposed adjacent each other and separated by a dividing wall having an end contiguous to said cavity, an outer rotor including a cylindrical disc mounted upon a shaft, a bearing means mounted upon said casing for rotatably supporting said shaft, outer rotor teeth disposed about the periphery of said disc and extending longitudinally therefrom, the outer surfaces of said outer rotor teeth disposed adjacent the cylindrical surface of said casing forming a wall of said cavity being constructed and arranged as arcs of circles having a constant radius substantially equal to the radius of said adjacent wall to rotate in sealing contact relative thereto, the inner surfaces of said outer rotor teeth being shaped as arcs of circles having a constant radius, an inner rotor having teeth formed by tangent circular convex and concave surfaces, said inner rotor being rotatably mounted within said cavity in eccentric meshing engagement within said outer rotor to provide spaces between said teeth of said rotors of varying size about the periphery of said inner rotor, said outer rotor teeth being spaced from each other to provide passageways connecting said ports with said spaces between said teeth of said rotors, the number of teeth upon said inner rotor being one less than the number of teeth upon said outer rotor, said circular concave and convex surfaces of said inner rotor teeth being shaped as arcs of circles having a constant radius, said inner circular surfaces of said outer rotor teeth having a radius of curvature slightly less than the radius of curvature of said circular concave surfaces of said inner rotor, the axis of rotation of said inner rotor being disposed along an imaginary line extending through the axis of rotation of said shaft and the center of said dividing wall, said radius of curvature of said inner circular surfaces of said outer rotor teeth and said circular concave surfaces of said inner rotor having an identical center which is disposed upon said imaginary line when said outer rotor teeth are centered upon said line, said inner rotor teeth extending at said line in tangency with and between a pair of said outer rotor teeth to the periphery of said outer rotor in sealing contact with said end of said dividing wall to displace a maximum amount of fluid from the spaces between said outer rotor teeth at said dividing wall and to seal said inlet port from said outlet port, and the centers of said rotors being displaced from each other along said line a distance equal to one-half of the height of said teeth upon said outer rotor to cause said inner rotor to have every one of its teeth in sufficient sealing contact with at least one of said teeth upon said outer rotor at all times to maintain an adequate seal between said spaces between said teeth and between said inlet and outlet ports about the longer path around the peripheries of said rotors.

2. A rotary pump as set forth in claim 1 wherein the thickness of said dividing wall is less than the distance between said outer rotor teeth along said cylindrical surface of said cavity to insure that said inner rotor teeth displace a maximum amount of fluid from said spaces between said outer rotor teeth when said inner rotor teeth are disposed between said ports.

References Cited in the file of this patent

UNITED STATES PATENTS

| | | |
|---|---|---|
| 1,682,564 | Hill | Aug. 28, 1928 |
| 1,682,565 | Hill | Aug. 28, 1928 |
| 1,753,476 | Richer | Apr. 8, 1930 |
| 1,863,335 | Hill | June 14, 1932 |
| 1,964,330 | Pitt | June 26, 1934 |
| 1,968,113 | Weaver | July 31, 1934 |
| 2,053,919 | Pigott | Sept. 8, 1936 |
| 2,124,377 | Schirmer | July 19, 1938 |
| 2,302,907 | Eilers | Nov. 24, 1942 |
| 2,336,479 | Graef | Dec. 14, 1943 |
| 2,386,896 | Hill et al. | Oct. 16, 1945 |
| 2,601,288 | Hill | June 24, 1952 |
| 2,601,397 | Hill et al. | June 24, 1952 |
| 2,615,399 | Edwards | Oct. 28, 1952 |
| 2,696,170 | Hill | Dec. 7, 1954 |

FOREIGN PATENTS

| | | |
|---|---|---|
| 316,295 | Great Britain | May 15, 1930 |
| 394,985 | Great Britain | July 5, 1933 |